(12) United States Patent
Ramey (10) Patent No.: US 11,215,209 B2
(45) Date of Patent: Jan. 4, 2022

(54) FRICTION CLAMP FOR TUBULAR STRUCTURES FEATURING LATERAL CONNECTORS

(71) Applicant: Willard Joseph Ramey, Grass Valley, CA (US)

(72) Inventor: Willard Joseph Ramey, Grass Valley, CA (US)

( * ) Notice: Subject to any disclaimer, the term of this patent is extended or adjusted under 35 U.S.C. 154(b) by 0 days.

(21) Appl. No.: 17/028,502

(22) Filed: Sep. 22, 2020

(65) Prior Publication Data

US 2021/0003158 A1 Jan. 7, 2021

Related U.S. Application Data

(63) Continuation-in-part of application No. 16/126,158, filed on Sep. 10, 2018, now Pat. No. 10,781,970.

(51) Int. Cl.

| F16B 7/04 | (2006.01) |
|---|---|
| F16B 2/22 | (2006.01) |
| F16B 2/00 | (2006.01) |
| A01G 9/20 | (2006.01) |
| A01G 9/24 | (2006.01) |
| A01G 9/22 | (2006.01) |
| F16B 5/06 | (2006.01) |
| A01G 9/26 | (2006.01) |

(52) U.S. Cl.
CPC .............. *F16B 7/0433* (2013.01); *A01G 9/20* (2013.01); *A01G 9/247* (2013.01); *F16B 2/005* (2013.01); *F16B 2/22* (2013.01); *F16B 7/0486* (2013.01); *A01G 9/22* (2013.01); *A01G 9/26* (2013.01); *F16B 5/0685* (2013.01)

(58) Field of Classification Search
CPC combination set(s) only.
See application file for complete search history.

(56) References Cited

U.S. PATENT DOCUMENTS

| 884,256 | A | * | 4/1908 | Addie | A47G 33/105 248/229.26 |
|---|---|---|---|---|---|
| 2,879,087 | A | | 3/1959 | Haglund | |
| 3,666,372 | A | * | 5/1972 | Lipowski | B43L 15/00 401/8 |
| 4,002,349 | A | | 1/1977 | Dopp | |
| 4,332,322 | A | * | 6/1982 | Jaeschke | A61M 25/002 206/363 |
| D270,329 | S | * | 8/1983 | Hardy | D8/356 |
| 4,610,122 | A | | 9/1986 | De Clercq | |
| 4,707,892 | A | * | 11/1987 | Nelson | F16B 7/0433 24/336 |
| D298,739 | S | * | 11/1988 | Richards, Jr. | D22/110 |
| 5,203,055 | A | | 4/1993 | Broadwater | |
| 5,309,604 | A | * | 5/1994 | Poulsen | A61M 5/1418 24/16 R |

(Continued)

*Primary Examiner* — Monica E Millner
(74) *Attorney, Agent, or Firm* — Heisler & Associates (57) ABSTRACT

The friction clamp includes a cylindrical body of elongate form between ends and with a slot into which a tubular item is snapped. Lateral connectors such as a receiver with a cylindrical recess therein receive an end of a tubular member, such as a member similar to that which snaps into the slot. As an alternative to the receiver, a tab is provided extending from the clamp laterally. The tab includes a hole through which hardware is placed, and an item having a similar tab is placed adjacent to the tab extending from the clamp and the hardware tightened for fixation at a desired rotational orientation. As another alternative to the receiver, a small friction clamp connector is provided on an exterior of the friction clamp. A small rod (or other item) snaps into the small clamp. The small clamp and rod can be provided separate from the friction clamp.

5 Claims, 8 Drawing Sheets

(56) References Cited

U.S. PATENT DOCUMENTS

| | | | | |
|---|---|---|---|---|
| D355,582 S | * | 2/1995 | Sleight | D8/354 |
| 5,538,212 A | * | 7/1996 | Kennedy | G03B 17/561 |
| | | | | 248/215 |
| 5,642,557 A | | 7/1997 | Clews | |
| 5,697,591 A | | 12/1997 | Cooper | |
| 5,752,297 A | | 5/1998 | Ramey | |
| 5,878,546 A | | 3/1999 | Westover | |
| D440,005 S | * | 4/2001 | Blanton | 24/16 R |
| 6,477,744 B1 | * | 11/2002 | Miles | B43K 23/002 |
| | | | | 24/3.1 |
| 6,669,264 B1 | * | 12/2003 | Tucker | B60J 7/104 |
| | | | | 296/100.15 |
| 6,691,382 B1 | * | 2/2004 | Su | B65D 7/20 |
| | | | | 24/335 |
| 7,597,296 B2 | * | 10/2009 | Conway | A47B 47/05 |
| | | | | 248/229.16 |
| D729,605 S | | 5/2015 | Ramey | |
| D732,009 S | * | 6/2015 | Bak | D14/229 |
| D745,117 S | | 12/2015 | Ramey | |
| 9,603,440 B2 | | 3/2017 | Nguyen | |
| 9,791,072 B2 | * | 10/2017 | Rodrigue | F16L 3/13 |
| 9,869,092 B1 | | 1/2018 | Rush | |
| 2004/0040247 A1 | | 3/2004 | Morse | |
| 2004/0154261 A1 | | 8/2004 | Miller | |
| 2010/0254123 A1 | * | 10/2010 | Brown | A42B 1/244 |
| | | | | 362/191 |
| 2012/0298808 A1 | | 11/2012 | Lockwood | |
| 2014/0161517 A1 | | 6/2014 | Lockwood | |

\* cited by examiner

FRICTION CLAMP FOR TUBULAR STRUCTURES FEATURING LATERAL CONNECTORS

CROSS-REFERENCE TO RELATED APPLICATIONS

This application is a continuation-in-part of U.S. patent application Ser. No. 16/126,158, filed on Sep. 10, 2018 and issued as U.S. Pat. No. 10,781,970 on Sep. 22, 2020, incorporated herein by reference in its entirety.

FIELD OF THE INVENTION

The following invention relates to friction clamps with generally semi-cylindrical forms and with a slot into which a tubular or other cylindrical member can snap for holding the clamp (and intermediate items such as flexible sheeting) to the tubular item. More particularly, this invention relates to clamps which feature a lateral connector such as in the form of a receiver which can receive an end of a tubular member similar to that which snaps into the slot, or a tab which can mate to a tab on an item to be connected to the clamp, through associated hardware, or a second small friction clamp, so that other items can be coupled to or otherwise suspended from the clamp, other than by being sandwiched between the tubular item and the slot therein.

BACKGROUND OF THE INVENTION

Friction clamps are known in the prior art which are typically formed of injection moldable plastic material, such as PVC (polyvinyl chloride) and which have sufficiently thin walls that they can snap onto a tubular or other cylindrical structure. Often the clamp is sized so that it can snap onto other elongate PVC pipes having a similar diameter. Friction clamps of different standard sizes can be provided for attachment to standard sizes of PVC pipes (or other tubular and/or cylindrical members). An example of such friction clamps is provided by Circo Innovations, Inc. of Grass Valley, Calif., under the trademark "SNAP CLAMPS." A common use for such friction clamps is to allow thin flexible sheeting material to be attached to tubular structural members, such as when providing simple enclosures such as greenhouses, or when providing shade structures or other structures formed of simple tubular elements and which require some flexible sheeting material to be attached thereto in some fashion.

While a great amount of flexibility is provided with basic friction clamps, allowing them to hold sheeting to a structural tubular skeleton, such as of PVC material, to achieve a variety of different desired configurations, friction clamps have some limits. Often joints between tubular structural members require some form of couplings having receiver recesses which are appropriately sized and oriented to hold tubular members adjacent thereto in a desired orientation. For instance, 90° elbows or three-way 90° elbows can provide contours for various different structures. With prior art friction clamps, the clamp is limited to holding sheeting material onto the underlying tubular member, and the tubular members need appropriate joint hardware to form a desired structure and to provide desired strength to the structure. If a clamp could have a way to attach to an end of a tubular or other structural member, such a clamp could provide the dual function of holding flexible sheeting material to the structure and providing an interface with additional structural members themselves, to join such elongate members together.

Some structural members of a tubular or other elongate nature are more temporary in nature or are desired to be included after a tubular skeletal structure has already been constructed. In the prior art, adding to existing structures at midpoints within the skeletal structure generally requires cutting of existing members so that other elements can be appropriately interposed therein where desired. This cutting and fitting process can be time-consuming and particularly undesirable for temporary modifications to a structure.

As one example, a greenhouse might be initially constructed, and after it has been completed, it may be determined that modifications to the greenhouse are called for, such as providing additional rigidity to the structure to withstand wind loads, or to allow for framing in of windows into walls of the structure, or to provide additional support to keep flexible fabric material of the greenhouse from sagging inwardly undesirably. In the prior art, to accommodate addition of such structural members, locations with an existing structure need to be identified, cut and fitted with new joints and structural members to complete the desired structural modifications. The time and expense associated with such modifications can be prohibitive. Furthermore, after completing the modifications, they might be determined to be suboptimal. If such additional structural elements could be merely "snapped" onto existing structural members in a temporary fashion, such structural modifications would be greatly simplified, reduce time involved and would provide for greater convenience and flexibility in making further modifications if initial modifications are less than optimal.

Accordingly, a need exists for a friction clamp which has a lateral connector thereon, such that tubular members and other items attached to such a lateral connector can be conveniently snapped onto and off of other tubular members through the existing slot in the friction clap.

SUMMARY OF THE INVENTION

With this invention, a friction clamp is provided which has been modified to include a lateral connector thereon. A basic main portion of the clamp is similar to prior art friction clamps, including a cylindrical body formed of at least partially flexible material. The body extends between a first end a second end opposite the first end and with the body having a slot extending between the first end and the second end. The slot is bounded by edges which are typically linear and define a width of the slot. These edges are typically slightly closer to each other than a diameter of an inner semi-cylindrical surface of the slot, and material forming the snap clamp is sufficiently flexible and elastic that a tubular member with a diameter matching the inner surface of the slot can be snapped between these edges, with the edges flexing laterally until the tubular member is captured within the slot.

The clamp of this invention further features a portion of at least one fastener extending laterally from the outer cylindrical surface of the cylindrical body. This portion of a fastener is in one embodiment a receiver extending linearly away from a central axis of the cylindrical body of the clamp. Preferably, this receiver has a cylindrical recess extending into an end of the receiver most distant from the cylindrical body of the clamp. This recess can receive an end of a tubular member, and in a preferred embodiment a tubular member having a similar diameter to that which is snapped into the slot of the clamp. In various embodiments, other sizes (or cross-sectional shapes) of elongate members could have their ends received within the recess of the receiver.

An end of the tubular member could be glued into the recess of the receiver, such as with PVC cement if the end of the tubular member and the clamp are both formed of PVC or other compatible materials, or some other adhesive could be utilized for a permanent attachment with in the recess. Alternatively, a friction fit can be provided and the end of the tubular member can be temporarily (or permanently) fitted within the recesses of the receiver. As another alternative, a fastener can be utilized passing through walls of the receiver and through the recess, as well as through an end of the elongate member, for temporary but secure attachment of an end of an elongate member within the recess of the receiver.

While a circular cross-section is shown for the receiver, other forms of cross-sections could alternatively be provided, such as square, rectangular or triangular, etc. The receiver is shown extending laterally within a plane generally perpendicular to a plane bisecting the edges of the slot of the clamp. However, the receiver could extend in other planes, such as within a plane coplanar with a plane bisecting the edges of the slot, or diagonal relative to the plane bisecting the edges of the slot.

In an alternative embodiment, the lateral connector is in the form of a tab extending laterally away from the outer cylindrical surface of the cylindrical body of the clamp. This tab has a hole passing laterally therethrough and a tab of similar (or other compatible) form on an end of a tubular or other elongate member can be placed adjacent to this tab, with appropriate hardware passing through the holes of the two tabs, and the hardware tightened to secure the elongate member to a clamp through the tabs. The tabs can be rotated relative to each other with the hardware loosened, and then the hardware can be tightened, so that adjustability is provided for the angle at which the elongate member is attached to the clamp through such tabs. Ribs on surfaces of the tab can assist in securely maintaining a desired angular orientation, especially when ribs are provided on both the tab of the clamp and the tab on the end of the tubular member. In one embodiment, a basic plug can be glued or friction fitted into an end of a tubular member, and an outer surface of such a plug can include a basic tab matching the tab extending laterally from the outer cylindrical surface of the clamp, so that any tubular member can have such a tab easily added thereto for connection of the elongate member to the clamp via the tabs at a desired angle.

While in one embodiment a single tab extends laterally from the clamp within a plane generally perpendicular to a plane bisecting the edges of the slot in the clamp, such a single tab could have other orientations relative to this plane bisecting the edges of the slot in the clamp. Furthermore, multiple tabs can be provided, such as two tabs oriented within a common plane on opposite sides of the clamp, or two tabs with an angular spacing other than 180°, such as a 90° spacing. A further alternative is to provide three tabs with generally equal circumferential spacing, and with one tab adjacent to each of the edges of the slot and one tab midway between these other two tabs and opposite the opening into the slot, and with each of the tabs general extending radially away from a central axis of the clamp. With such multiple tabs, the snap clamp can function in a hybrid fashion, both to temporarily and easily snap onto existing tubular structures through the slot thereof, with or without simultaneously also holding sheeting material of a flexible nature to the tubular structure, and also can provide a structural interface for connecting to other items such as elongate members or plugs with hooks, or other similar accessories.

In one embodiment, instead of having a receiver or tab to provide an auxiliary connection method for attaching of structures to the clamp, a small connector in the form of a small clamp is fixed to an exterior portion of a cylindrical body of the larger main clamp. As with other embodiments, the larger main clamp can snap onto a tubular member, such as a structural member of a greenhouse or some other elongate tubular structure. The small connector is provided as a small clamp with a geometry generally similar to that of the main clamp. The small clamp facilitates attachment to a variety of different structures.

For instance, irrigation tubing can be snapped into this small clamp so that such irrigation tubing can be securely held to structural members of a greenhouse or other structure which is constructed of tubular members. Other elongate items such as electrical wiring (such as for power or communication) could similarly be held against walls of such a structure by utilizing such a clamp.

A rod element is sized to snap into this small clamp. Sheeting material can be trapped between the rod element and the small clamp, with the sheeting held securely by the rod being snapped into the small clamp. In one use of this technology, a greenhouse or other structure including tubular support members has a first sheeting layer on an outside of these tubular structures. Utilizing the clamp as described above, a second layer of sheeting material can be held to the small clamp by entrapment between the small clamp and a rod element, so that an inner layer of sheeting can also be provided for such a structure. Provision of such a double wall structure largely entraps an air gap therebetween, which can allow for insulation of the structure to some extent. In one scenario, such a double walled structure could allow for earlier planting in cold climates. As the temperature warms, such as above freezing, the rods can be removed from the small clamps and the sheeting removed, so that the greenhouse transforms into a single sheeting layer structure, to avoid overheating as temperatures increase.

In one embodiment, one sheeting layer is netting, such as to keep birds or other pests out of the greenhouse, while the other sheeting layer can be a non-foraminous flexible layer, such as flexible plastic sheeting material to provide for temperature control, protection from wind, rain, etc. and otherwise providing a controlled growth environment.

The small clamp can be provided alone without being part of a larger main clamp, and including a planar plate thereon which can carry double-sided tape, other adhesives, or other fasteners (e.g. staples) for attachment of such a small clamp to other structures. Such a plate can similarly be provided on the rod for attachment of other structures directly to the rod through the plate and an appropriate fastening methodology similar to that of the plate attached to a standalone small clamp. A snap type fastener of many uses is thus provided.

OBJECTS OF THE INVENTION

Accordingly, a primary object of the present invention is to provide a friction clamp which includes a lateral connector through which items can be attached to the clamp, other than through the slot in the clamp.

Another object of the present invention is to provide a friction clamp which can attach both to flexible sheeting material and to elongate structural members and other items.

Another object of the present invention is to provide a coupling for use with tubular skeletal structures which is a hybrid between attaching to ends of structural members and snapping laterally onto structural members.

Another object of the present invention it to provide a connector within a tubular structure which can be temporarily attached and detached securely within the structure to provide temporary and/or simplified structural initial construction or modification to existing structures.

Another object to the present invention is divide a method for attaching items within a tubular skeletal structure by coupling the items to a lateral connector associated with a clamp.

Another object to the present invention is to simplify the modification of an existing tubular structure.

Another object of the present invention is to provide a connector for tubular structures which can be readily modified in its position to optimize the tubular structure in a simple fashion.

Another object of the present invention is to provide a friction clamp which can snap onto tubular members which itself has an additional small clamp mounted thereto which can hold tubular members therein.

Another object to the present invention is to provide a friction clamp and rod which can trap flexible sheeting material therebetween for mounting a flexible sheeting material to a wall of a structure such as a greenhouse.

Another object to the present invention is to provide a double walled greenhouse and friction clamps to facilitate construction of such a double walled greenhouse.

Another object to the present invention is to provide a snap fastener assembly including a clamp and a rod which snaps into a core of the clamp, and with at least one of the portions of the fastener including a planar plate which can attach to other structures.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 (FIGS. 1, 7 and 8) is directed to a clamp of a friction clamp variety which can snap onto a cylindrical/tubular member M through a slot 30, and which also includes a receiver 40 as one form of lateral connector which can receive an end of a lateral member L within a recess 50 thereof. The clamp 10 can conveniently connect by snapping onto a midpoint of a tubular member M, and can also have an end of a second lateral member L attached thereto through the receiver 40. In an alternative embodiment tab clamp 110 (FIG. 9) a tab 130 replaces the receiver 40 and can cooperate with a tab cap 115 attachable to an end of a lateral member L or other member M to allow for attachment therebetween, and particularly at a variety of different relative angles.

Figure 1:
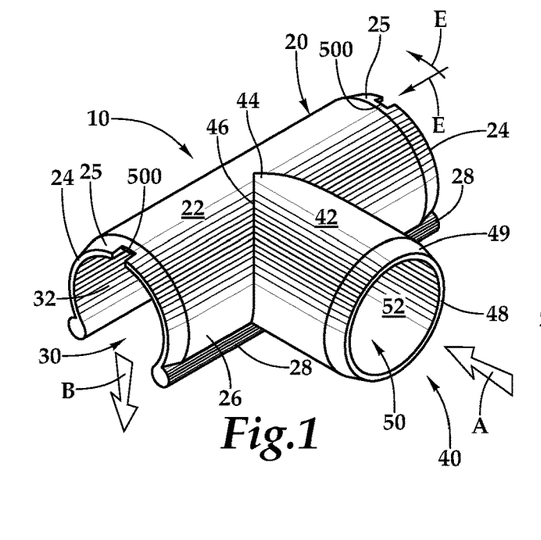
FIG. 1 is a perspective view of the friction clamp of this invention, featuring a receiver for coupling to other tubular/cylindrical members, according to a first embodiment.
Figure 2:
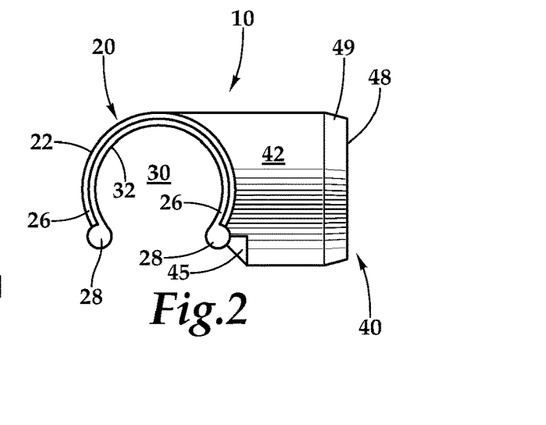
FIG. 2 is a left side elevation view of that which is shown in FIG. 1.
Figure 3:
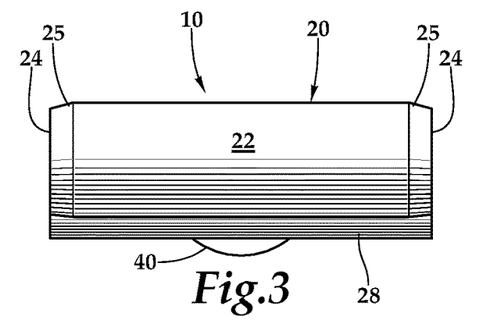
FIG. 3 is a rear elevation view of that which is shown in FIG. 1.
Figure 4:
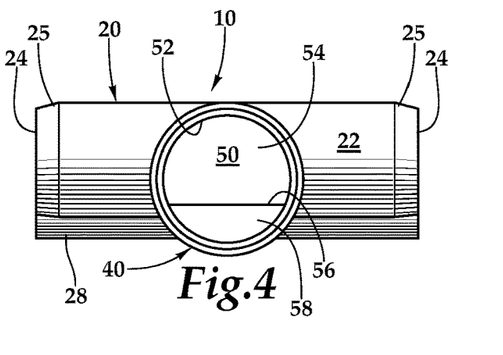
FIG. 4 is a front elevation view of that which is shown in FIG. 1.
Figures 5, 6:
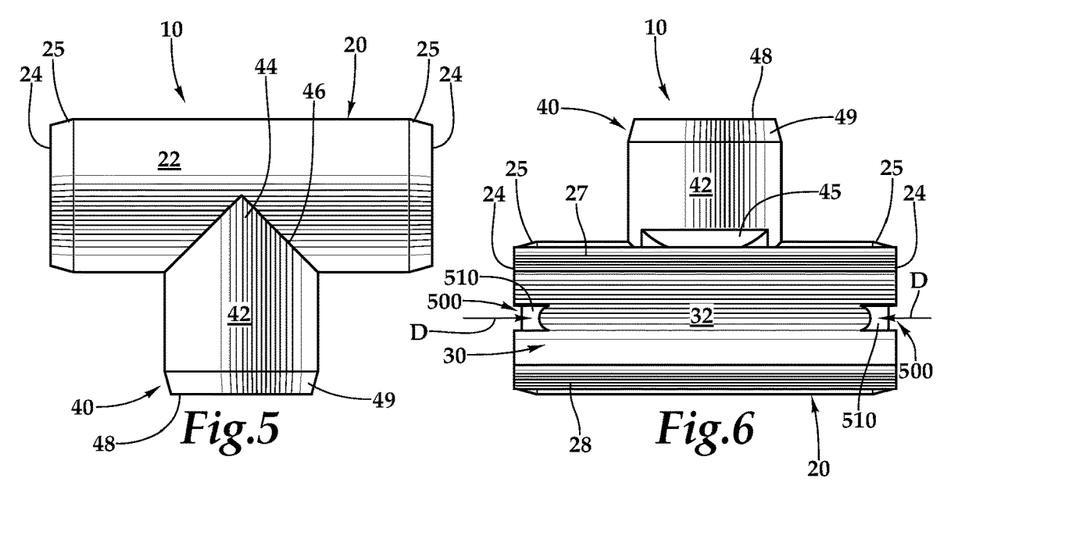
FIG. 5 is a top plan view of that which is shown in FIG. 1.
FIG. 6 is a bottom plan view of that which is shown in FIG. 1.
Figure 7:
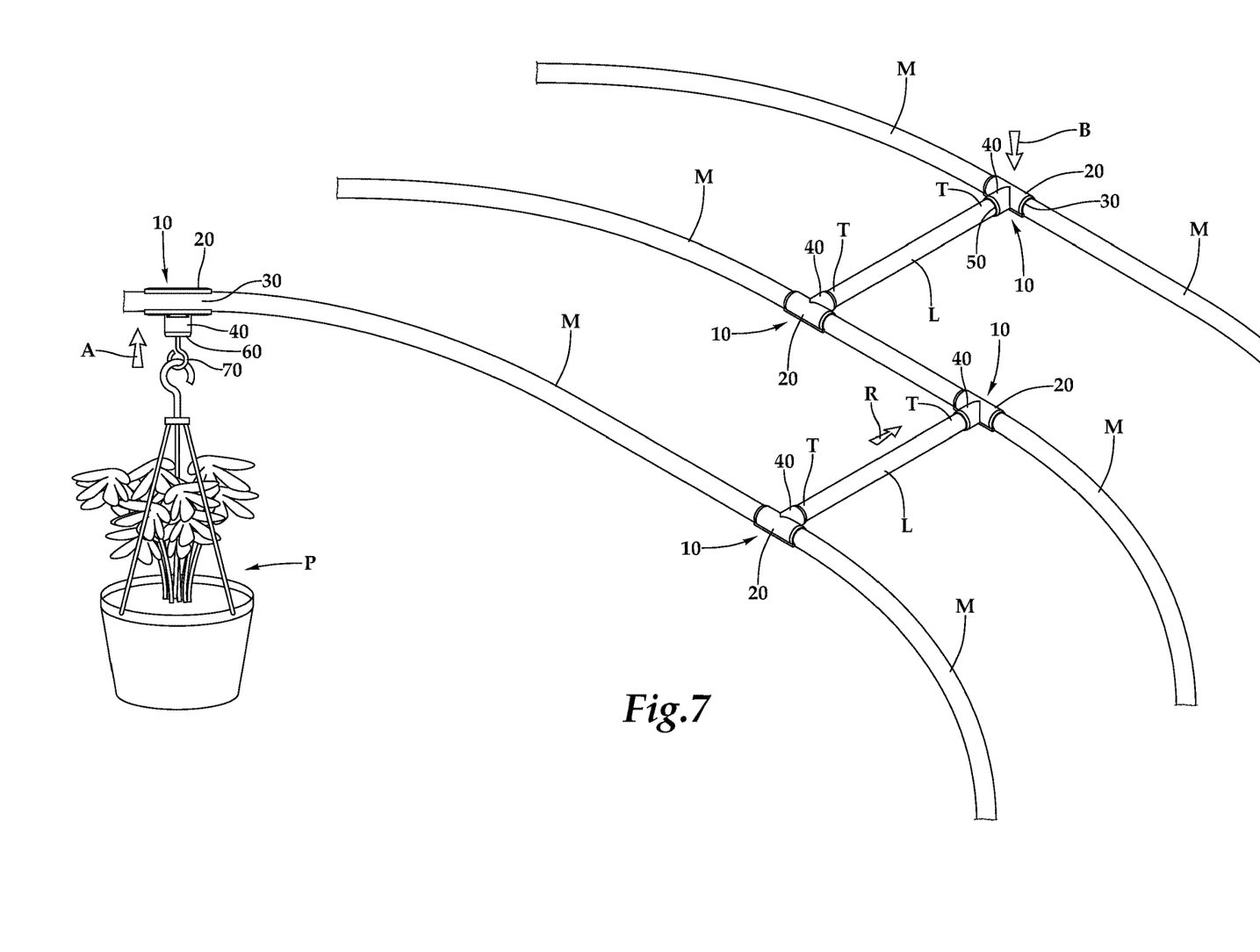
FIG. 7 is a perspective view of a structure having a series of curving tubular members oriented parallel to each other and with lateral connecting members interposed therebetween and utilizing clamps such as those shown in FIGS. 1-6 for joining the lateral members to the tubular members, according to one method of use of this invention, and also showing a clamp of this invention along with a plug and hook for suspending an item such as a plant from one of the elongate tubular members.
Figures 8, 9:
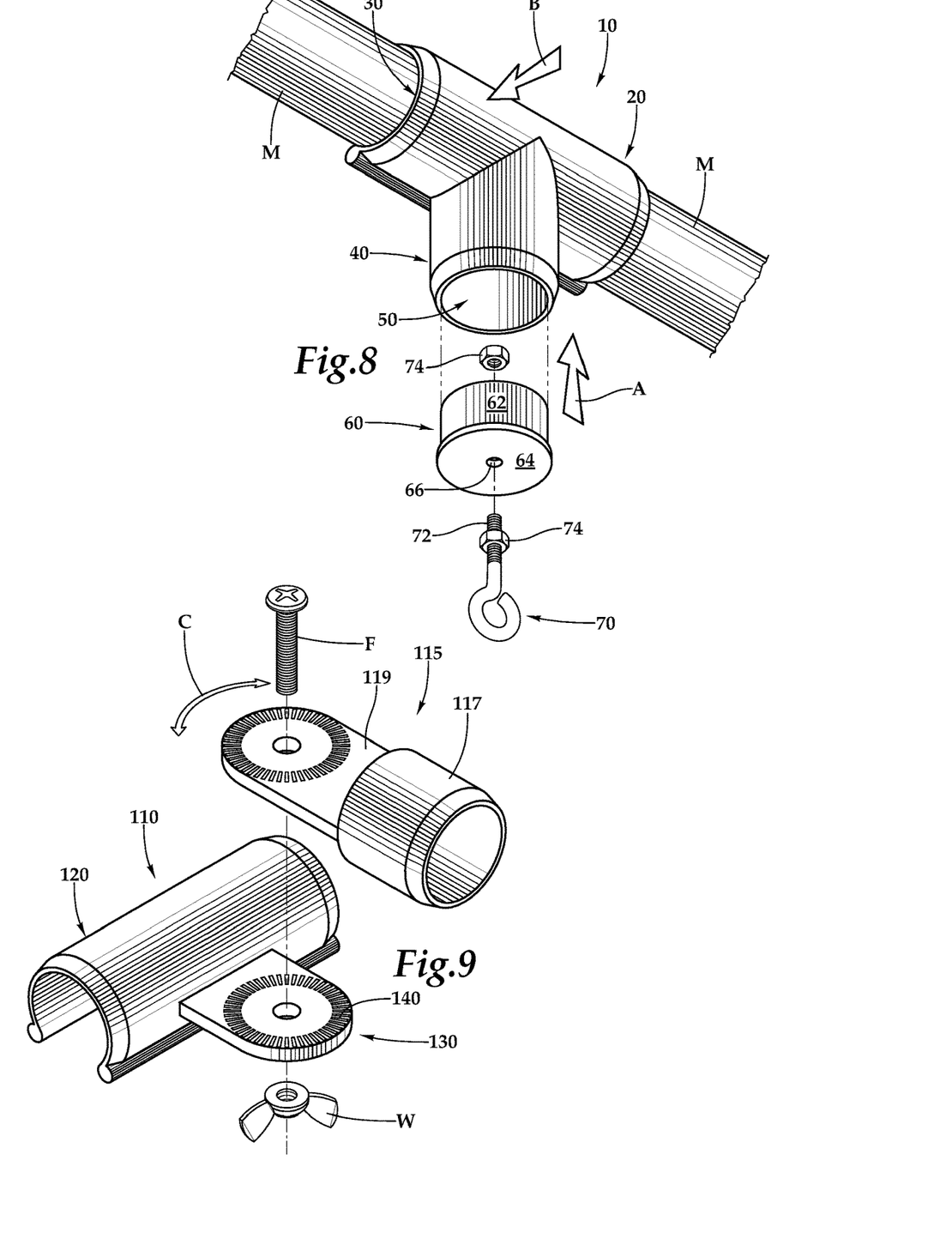
FIG. 8 is a perspective view of that which is shown in FIG. 1, with the clamp snapped onto a tubular member and showing how a plug and hook can be connected to a receiver of the clamp.
FIG. 9 is a perspective view of an alternative embodiment tab clamp featuring a lateral connector in the form of a tab replacing the receiver of FIG. 1, and showing a basic cap attachable to an end of a tubular member which also has a tab thereon which can mate with the tab of the tab clamp, for attachment at a variety of different pivotable angles.
Figure 10:
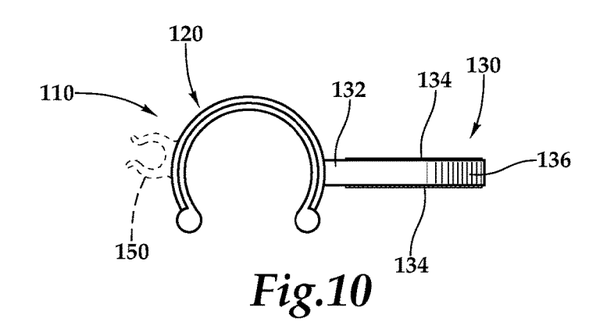
FIG. 10 is a left side elevation view of that which is shown in FIG. 9.
Figure 11:
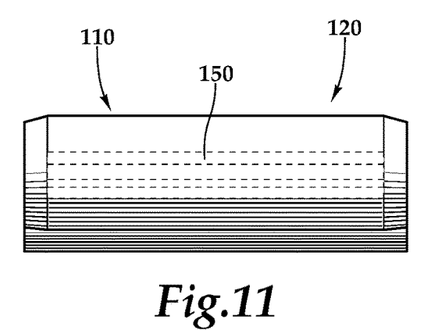
FIG. 11 is a rear elevation view of that which is shown in FIG. 9.
Figure 12:
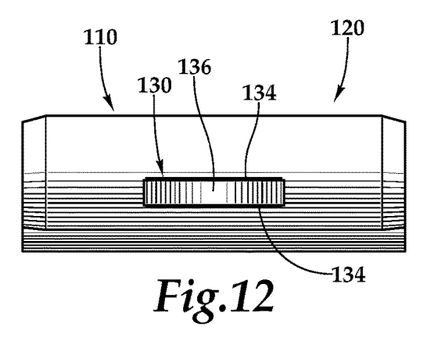
FIG. 12 is a front elevation view of that which is shown in FIG. 9.
Figure 13:
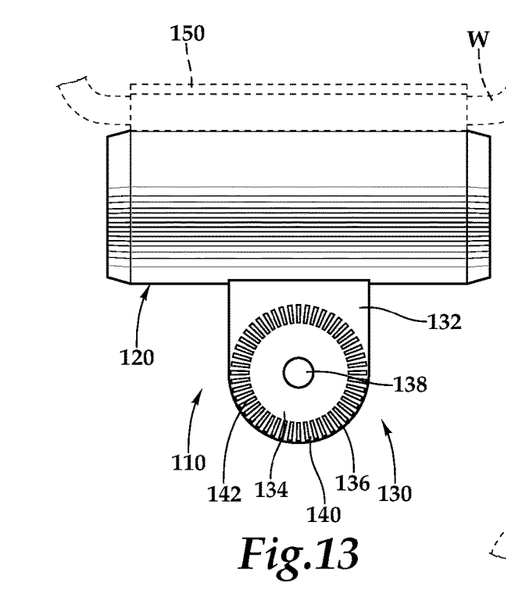
FIG. 13 is a top plan view of that which is shown in FIG. 9.
Figure 14:
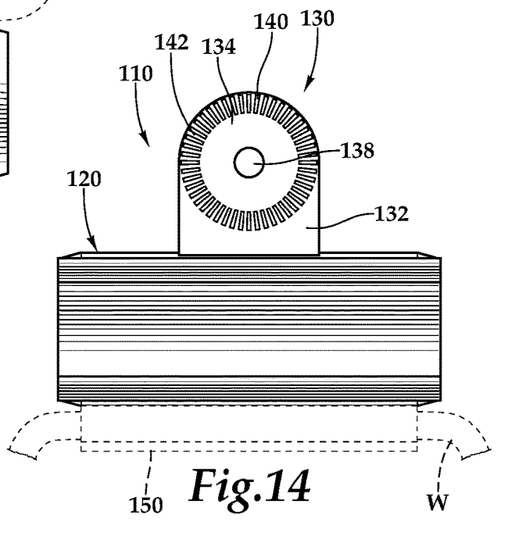
FIG. 14 is a bottom plan view of that which is shown in FIG. 9.

In essence, and with particular reference to FIGS. 1, 7 and 8, basic details of the clamp 10 are described, according to an exemplary embodiment and certain alternative embodiments. The clamp 10 includes a cylindrical body 20 of generally linear elongate form and having a slot 30 along an undersurface thereof. The slot 30 is sized sufficiently large to snap onto a tubular member M laterally, but sufficiently small that the cylindrical body 20 is retained on the tubular member M after having been snapped onto the tubular member M and through the slot 30 (along arrow B of FIGS. 1, 7 and 8). The clamp 10 also includes a receiver 40 extending laterally from the cylindrical body 20, and typically at a midpoint of the cylindrical body 20. This receiver 40 includes a recess 50 which is typically closed at an interior thereof, and has a generally cylindrical form for receiving an end of a tubular member, such as a lateral member L (FIG. 7) therein. A plug 60, such as including a hook 70 (FIG. 8) can be fitted within this receiver 40, as an alternative to fitting of an end of a tubular member M therein.

In an alternative embodiment (FIG. 9), a tab clamp 110 is provided with a cylindrical body 120 similar to the cylindrical body 20 of the clamp 10. The tab clamp 110 replaces the receiver 40 with the tab 130 which can have a tip tab 119 of a tab cap 115 mated thereto, through a bolt F passing through a central hole 138, to provide an alternative lateral connection off of this cylindrical body 120, and which facilitates rotational adjustment (along arrow C of FIG. 9). Other embodiments are also disclosed in FIGS. 15-20 with multiple tabs 230, 330, 430 thereon.

More specifically, and with particular reference to FIGS. 1-8, particular details of the clamp 10 are described according to this first exemplary embodiment. The clamp 10 is preferably entirely formed from a unitary mass of homogenous material, such as injection moldable plastic, and in one embodiment formed of poly vinyl chloride (PVC) such as that commonly used for elongate tubular members M. Other materials could alternatively be utilized, including plastics, metals and composites.

The clamp 10 includes a cylindrical body 20 which is preferably generally in the form of a friction clamp which can snap onto a tubular member M laterally (along arrow B of FIGS. 1, 7 and 8). This cylindrical body 20 thus includes an outer semi-cylindrical surface 22 which extends circumferentially until it terminates at edges 26 adjacent to a slot 30 in an underside of the cylindrical body 20. These edges 26 are preferably linear and also preferably include enlarged snap lips 28 to strengthen these edges 26 and allow them to most smoothly rest against a member M before snapping pressure (along arrow B) is applied to cause this slot 30 to snap onto the tubular member M (along arrow B of FIGS. 1, 7 and 8).

This cylindrical body 20 can have a variety of different lengths between opposing ends 24, and most typically is approximately three times longer between the ends 24 than a diameter of the outer semi-cylindrical surface 22. Other lengths for the cylindrical body 20 could alternatively be provided. Preferably, a taper 25 is provided directly adjacent to each of the ends 24 of the outer semi-cylindrical surface 22, which is otherwise preferably smooth.

The slot 30 includes an inner semi-cylindrical surface 32 facing inwardly and generally spaced from the outer semi-cylindrical surface 22 by a thickness of the cylindrical body 20. This inner semi-cylindrical surface 32 can be smooth, but most probably includes a series of longitudinal ribs extending parallel to each other between the ends 24. These ribs preferably have a height extending away from the inner semi-cylindrical surface 32 which is less than a thickness of the cylindrical body 20, and roughens the inner semi-cylindrical surface 32 somewhat to allow a member M or other structure upon which the clamp 10 is snapped to most thoroughly engage the member M. Also, commonly flexible sheeting material can be interposed between the clamp 10 and the tubular member M, such as plastic sheeting material forming a wall of a temporary structure, such as a greenhouse. Ribs on the inner semi-cylindrical surface 32 can help to keep such sheeting material from sliding between the clamp 10 and member M.

The receiver 40 provides one form of a lateral connector for fastening to other objects, and particularly ends of tubular or other cylindrical lateral members L (FIGS. 7 and 8). This receiver 70 is generally in the form of a cylindrical structure closed at an end adjacent to the cylindrical body 20 and open at an opposite end. In particular, the receiver 40 includes an outer cylindrical surface 42 which includes a proximal end defined by a combination of a root tip 44 and a root arch 46 where the outer cylindrical surface 42 transitions into the outer semi-cylindrical surface 22 of the cylindrical body 20. The outer cylindrical surface 42 extends away from this cylindrical body 20 until it terminates at a distal end defined by a rim 48, typically of circular form.

The receiver 40 in this embodiment has a somewhat truncated and modified form on a lower portion thereof where it comes adjacent to one of the edges 26 of the snap lips 28 on the cylindrical body 20. In particular, the outer cylindrical surface 42 transitions into a conical region 45 opposite the rim 48 which smoothly transitions an under portion of the receiver 40 into a central portion of an adjacent one of the edges 26 and snap lips 28.

An interior of the receiver 40 is defined by the recess 50. This recess 50 includes an inner cylindrical surface 52 which extends in from the rim 48 until it terminates at a cylindrical floor 54. This cylindrical floor 54 has a cylindrical form generally defining a constant thickness continuous with the outer semi-cylindrical surface 22 and maintaining a substantially constant thickness for this cylindrical body 20 away from the inner semi-cylindrical surface 32. On lower portions of the recess 50, opposite the conical region 45 on the outer cylindrical surface 42 of the receiver 40, this cylindrical floor 54 preferably transitions across an inner corner 56 to a planar facet 58, generally opposite the conical region 45 angled toward the rim 48 somewhat as the facet 58 extends away from the inner corner 56. The inner corner 56 and facet 58 allow for the receiver 50 to maintain substantially constant wall thickness on the lower portion of the receiver 40 where it needs to transition into the edge 26 and snap lip 28 adjacent to the receiver 40.

The recess 50 of the receiver 40 preferably has a diameter similar to that of the slot 30 of the cylindrical body 20. In this manner, a member M can either be attached laterally to the clamp 10 through the slot 30 (along arrow B of FIGS. 1, 7 and 8) or by placement of an end thereof into the recess 50 of the receiver 40 (along arrow A of FIGS. 1, 7 and 8). In an alternative embodiment, the cylindrical body 20 and slot 30 can be sized for one size of member M, while the recess 50 and receiver 40 can be sized for a different size of elongate tubular lateral member L or other structure (such as the plug 60 shown in FIGS. 7 and 8). Thus, the clamp 10 can be provided in various different sizes to fit different structural elements, such as tubular members, either with such structural elements being similar in size for the receiver 40 and the slot 30, or for different sizes for the receiver 40 and slot 30.

Furthermore, while the receiver 40 is shown extending laterally relative to a direction that the slot 30 snaps onto a member M, the receiver 40 could extend away from the cylindrical body 20 of the clamp 10 in some other orientation, such as aligned with the direction that the slot 30 snaps onto a member M, or at some diagonal orientation. The receiver 40 is preferably located at a middle distance between ends 24 of the cylindrical body 20. However, the receiver 40 could be provided closer to one end 24 or the other, if desired. Furthermore, while only a single receiver 40 is shown, it is conceivable that two (or more) receivers 40 could be provided, such as one extending laterally in opposite directions so that a receiver 40 would be provided adjacent to each of the edges 26 of the cylindrical body 20. Other orientations for such receivers 40 could be provided, similar to the various orientations for tabs 130 in the embodiment of FIGS. 15-20.

With particular reference to FIGS. 7 and 8, details of a plug 60 and hook 70, providing an alternative item for attachment to the receiver 40, other than an end of a tubular or cylindrical lateral member L, are described. In FIG. 8 a plug 60 is shown which fits within the recess 50 in the receiver 40. This plug 60 could be formed of similar material from which the clamp 10 is formed, and attached by friction fit or by utilization of an adhesive, or other fastener, such as a lateral pin extending through the outer cylindrical service 42 in the receiver 40 and through the plug 60, for retaining the plug 60 within the receiver 40. Such an alternative fastener could similarly be utilized in other environments where an end of a tubular or cylindrical lateral member L is fitted into the recess 50 of the receiver 40.

The plug 60 could alternatively be formed of a resilient rubber material and sized with a friction fit so that it fits snugly and securely, but removably, into the recess 50 of the receiver 40. The plug 60 includes a cylindrical sidewall 62 which is dimensioned to fit with a designed degree of snugness to meet performance objectives of the user, which could include a friction fit or a tight tolerance fit or a loose tolerance fit. An outer flat surface 64 defines an outer portion of the plug 60. Preferably a bore 66 passes through this outer flat surface 64 entirely through the plug 60. A hook 70, such as with an elongate threaded shaft 72, can fit through the bore 66, and utilize one or more nuts 74 to be fastened to the plug 60. In this way, when the plug 60 is attached to the receiver 40, a hook 70 is presented from which items can be hung. In one example, this placement of the plug 60 into the recess 50 (along arrow A of FIG. 7) allows for placing an item such as a hanging plant P from the hook 70, suspended from the plug 60 fit within the receiver 40 of the clamp 10. A variety of other items can similarly be suspended from the clamp 10 in this manner, so that the clamp 10 can conveniently provide attachment points by snapping such a clamp 10 onto members L, M where desired.

With particular reference to FIGS. 9-14, details of an alternative embodiment tab clamp 110 are described. The tab clamp 110 is similar to the clamp 10 of FIGS. 1-8, except that the receiver 40 is replaced with a different lateral connector in the form of a tab 130. Thus, a similar cylindrical body 120 is provided as the cylindrical body 20 associated with the clamp 10. Importantly, an additional element is typically provided, referred to as a tab cap 115, which can attach to an end of a cylindrical/tubular lateral member L through a receiver 117 and having a tip tab 119 extending from the tab 115. The tip tab 119 is preferably similar to the tab 130.

The tab 130 is generally a planar structure which is preferably formed as a unitary mass along with other portions of the tab clamp 110, such as from injection moldable plastic material. This tab 130 extends from a root 132 adjacent to the cylindrical body 120 out to an arched edge 136 opposite the root 132. The tab 130 includes opposing faces 134 which are preferably planar and parallel to each other, defining a thickness of the tab 130. A center hole 138 passes between the faces 134 and through the tab 130 laterally. Two such tabs 130 either on separate tab clamps 110, or with one tab 130 and a tip tap 119 on a tab cap 115 (FIG. 9), can be brought adjacent to each other and held together by tightening a bolt F or other fastener along with a wing nut W or other nut onto the bolt F, and tightening until the tab 130 and tip tab 119 are tightly held together. Importantly, before such tightening, a pair of such tabs 130, 119 can be rotated relative to each other (about arrow C of FIG. 9) so that angular adjustability is provided with the tab clamp 110.

To assist in holding the tabs 119, 130 in a selected relative orientation when the fastener F and wing nut W are tightened, ribs 140 preferably extend radially away from the center hole 138 and away from each of the faces 134. Troughs 142 are provided between the ribs 140. With similar ribs 140 and troughs 142 on each of the faces 134 of each of the tabs 119, 130, when these faces 134 of adjacent tabs 119, 130 are brought adjacent to each other, the ribs 140 fit into troughs 142 to cause a resistance to undesired rotation, especially when the bolt F and wing nut W are tightened.

While the tab 130 is shown extending laterally from this cylindrical body 120 and lateral to the direction that this cylindrical body 120 snaps onto adjacent tubular members, this tab 130 could be oriented in a plane aligned with a direction that the cylindrical body 120 snaps onto a tubular member M, or in other orientations than those that are depicted herein.

With particular reference to FIGS. 10, 11, 13 and 14 an additional small clamp 150 is shown, as an option. The small clamp 150 is shown opposite the tab 130, but it could be located closer to the tab 130. The small clamp could also be provided in similar positions on the clamp 10 (FIGS. 1-8). The small clamp 150 can have small elongate items therein, such as irrigation tubing, wiring W, or other small elongate items removably attached thereto. Each small clamp 150 includes a pair of opposing fingers that can "snap" onto an elongate item.

Figures 15, 16:
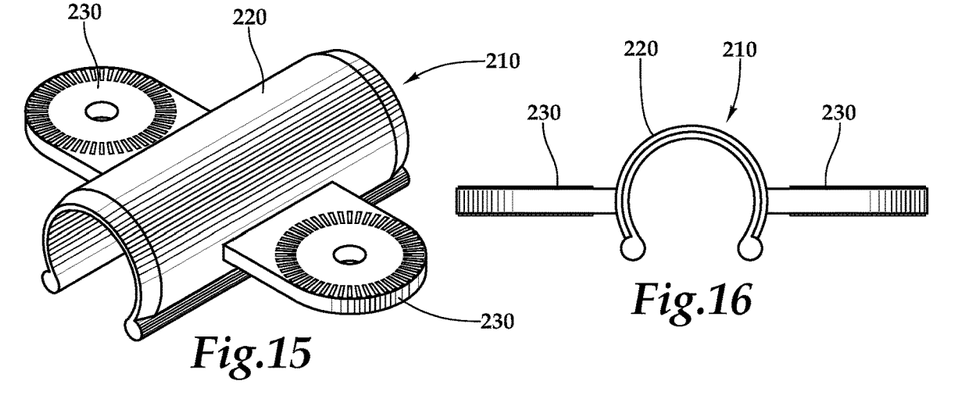
FIG. 15 is a perspective view of a further alternative embodiment similar to that which is shown in FIGS. 9-14, but featuring two tabs extending laterally in opposite directions from a cylindrical body of the clamp.
FIG. 16 is a left side elevation view of that which is shown in FIG. 15.

With particular reference to FIGS. 15 and 16, an alternative embodiment dual tab clamp 210 is described. The dual tab clamp 210 is similar to the tab clamp 110, except that two tabs 230 extend from opposite sides of the cylindrical body 220. Thus, two different tabs 230 are available for attachment to two separate additional members, such as through tab caps 115 (FIG. 9).

Figure 17:
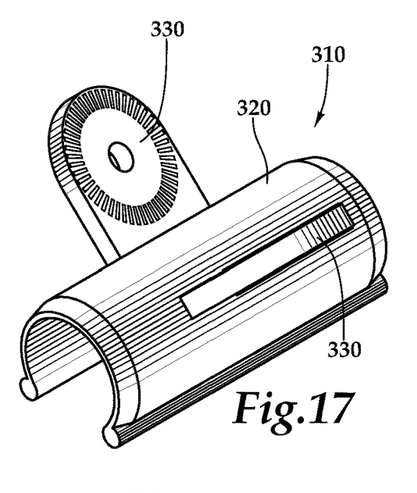
FIG. 17 is a perspective view of a further alternative embodiment of that which is shown in FIG. 9-14, but featuring two tabs spaced 90° away from each other extending from the cylindrical body of the clamp.
Figure 18:
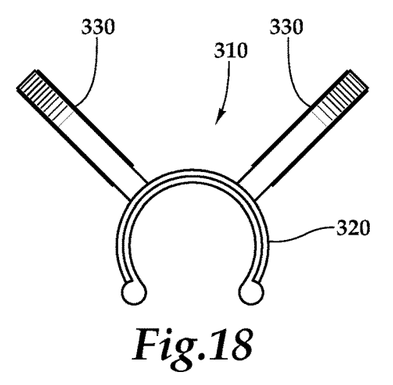
FIG. 18 is a left side elevation view of that which is shown in FIG. 17.

With particular reference to FIGS. 17 and 18, a dual tab 90° clamp 310 is described. This dual tab 90° clamp includes a cylindrical body 320 with a pair of tabs 330 extending therefrom, but not within a single plane, but rather spaced approximately 90° away from each other. This provides further flexibility in presenting tabs 330 in desirable orientations for use in attaching two adjacent tubular members and/or other items.

Figure 19:
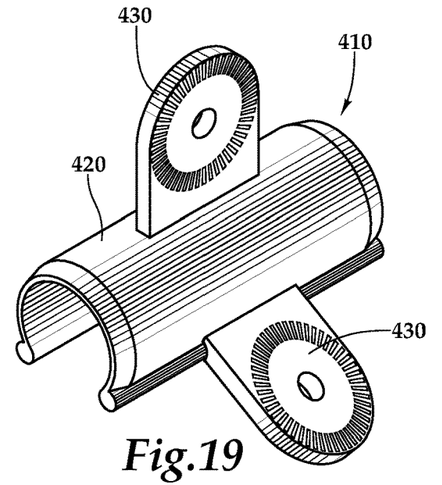
FIG. 19 is a perspective view of a further alternative embodiment of that which is shown in FIGS. 9-14, but featuring three tabs spaced symmetrically away from each other and extending away from the cylindrical body of the clamp of this embodiment.
Figure 20:
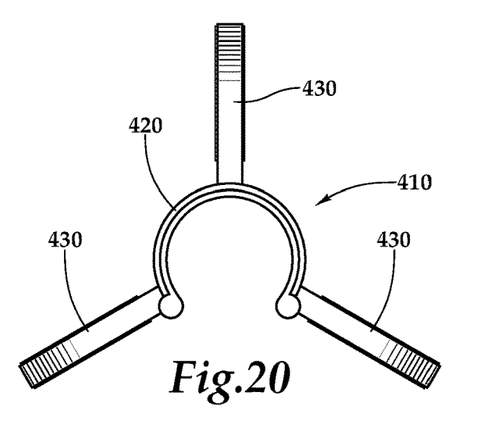
FIG. 20 is a left side elevation view of that which is shown in FIG. 19.

With particular reference to FIGS. 19 and 20, a tri-tab clamp 410 is described. The tri-tab clamp 410 includes a cylindrical body 420 with three tabs 430 extending radially away from a central axis thereof. This cylindrical body 420 is similar to the cylindrical bodies 120, 220, 320 of preceding embodiments. The three tabs 430 are oriented with one tab opposite the slot in the cylindrical body 420, and with two tabs 430 adjacent to edges of the slot in the cylindrical body 420, and generally with each of the tabs 430 spaced an equal distance away from each other. Further useful options for attachment of adjacent items to such a tri-tab clamp 410 are thus provided.

With particular reference to FIGS. 21-26 and 39, an alternative to the clamp 10 is described, in the form of a multi-slot friction clamp 510. The multi-slot friction clamp 510 is similar to the clamp 10 in that it includes a hollow cylindrical body 520 with a slot 530 sized to allow a tubular member to snap into the slot and be held frictionally within the cylindrical body.

Figures 21, 22, 23, 24, 25, 26, 27, 28:
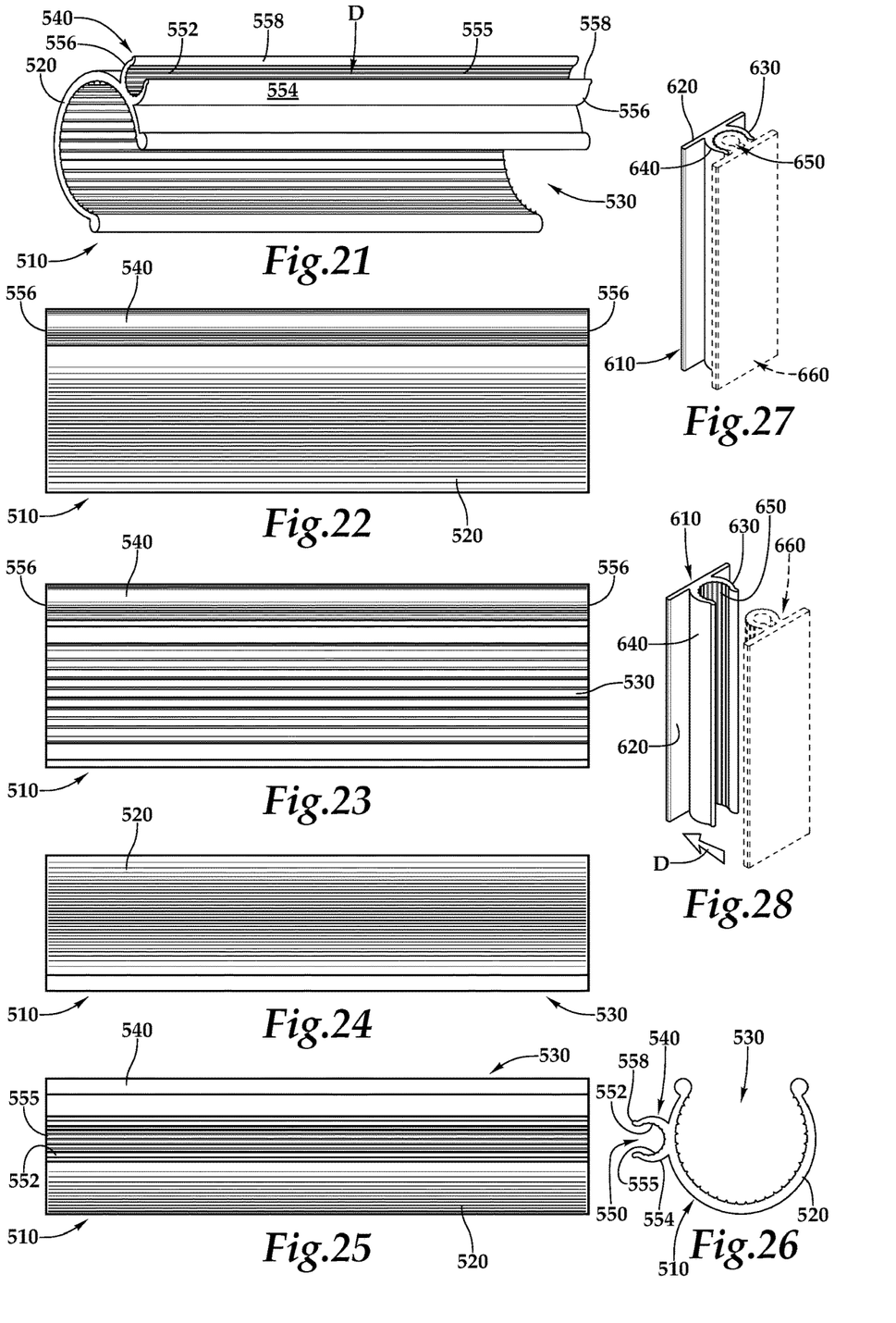
FIG. 21 is a perspective view of a multi-slot friction clamp according to a further embodiment of this invention.
FIG. 22 as a top plan view of that which is shown in FIG. 21.
FIG. 23 is a bottom plan view of that which is shown in FIG. 21.
FIG. 24 is a left side view of that which is shown in FIG. 21.
FIG. 25 is a right side view of that which is shown in FIG. 21.
FIG. 26 is a rear end view of that which is shown in FIG. 21 with a front end view being a mirror image.
FIG. 27 is a perspective view of a small friction clamp with a rod structure snapped into a slot leading into a core of the small friction clamp, and with the rod structure shown in broken lines.
FIG. 28 is a perspective view of the small friction clamp of FIG. 27 and with a rod structure spaced therefrom but aligned for snapping into a slot leading into a core of the small friction clamp.
Figure 29:
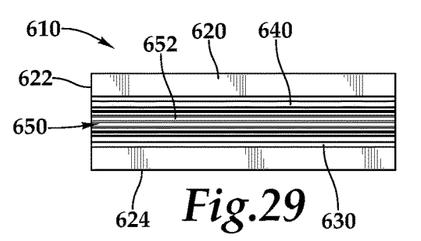
FIG. 29 is a front elevation view of that which is shown in FIGS. 27 and 28.
Figure 30:
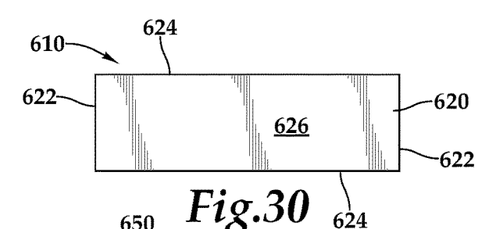
FIG. 30 is a rear elevation view of that which is shown in FIGS. 27 and 28.
Figure 31:
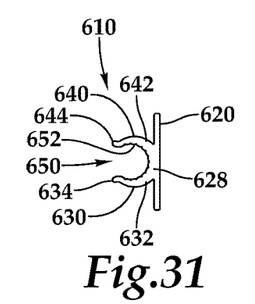
FIG. 31 is a right side elevation view of that was shown in FIGS. 27 and 28.
Figure 32:
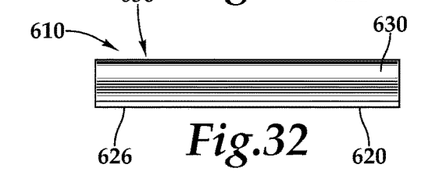
FIG. 32 is a top plan view of that which is shown in FIGS. 27 and 28.

Instead of the receiver 40 (or tab 130) the multi-slot friction clamp 510 includes a small connector 540 affixed to an outer portion of the cylindrical body 520. This small connector 540 is essentially a miniature version of the cylindrical body 520 and slot 530. In particular, the small connector 540 includes a slot 550 leading into a hollow interior of the small connector 540, bounded by an inner cylindrical surface 552. An outer cylindrical surface 554 is outboard of the inner cylindrical surface 552 and this outer surface 554 is attached to the cylindrical body 520. Most preferably, this point of attachment is circumferentially spaced 90° away from a centerline of the slot 530 of the cylindrical body 520. The slot 550 on the small connector 540 preferably faces away from the cylindrical body 520 upon which the small connector 540 is mounted.

The small connector 540 extends between open ends 554, defining a length of the small connector 540, which is preferably similar to the length of the cylindrical body 520 of the multi-slot friction clamp 510 (e.g. four inches long when the slot 530 has a one inch diameter, or shorter to better attach to curving tubular members). The slot 550 is bounded by snap lips 558 defining a width of the slot 550 between the lips 558. This width of the slot 550 is probably slightly less than a diameter of the inner cylindrical surface 552, so that an appropriately sized cylindrical structure can snap past the snap lips 558 (along arrow D of FIGS. 21 and 34) and be retained within the slot 550 of the small connector 540. Most preferably, inner cylindrical surface 552 includes grooves 555 which extend longitudinally upon the inner cylindrical surface 552. These grooves 555 help the small connector 540 to hold flexible sheeting materials (FIG. 39) therein when a cylindrical object is on an opposite side of the flexible sheeting materials and snapped into the slot 550 of the small connector 540.

Figure 39:
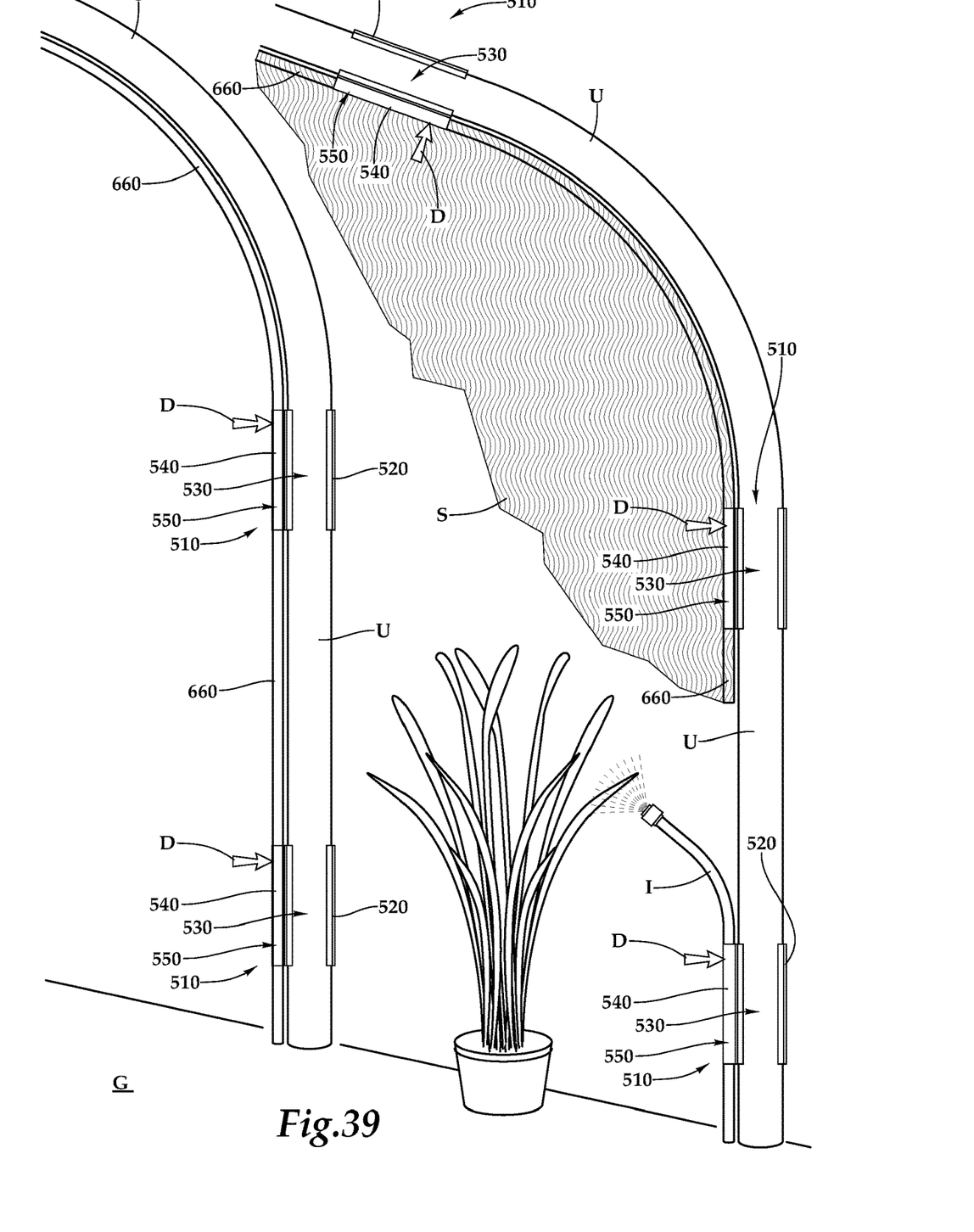
FIG. 39 is a perspective view of a greenhouse constructed from tubular members and sheeting, and utilizing the multi-slot friction clamp such as that shown in FIG. 21 to hold sheeting elements and irrigation lines to the tubular members of the greenhouse.

With particular reference to FIG. 39, example uses of the multi-slot friction clamp 510 are disclosed. In a particular example depicted therein, a structure such as a greenhouse G is formed of multiple upright members U which are tubular in shape and can be linear or can be curving, at least gradually. The multi-slot friction clamp 510 can attach to the tubular upright members U with the cylindrical body 520 snapped onto the upright tubular member U and leaving the small connector 540 available to hold other cylindrical objects. Examples of such cylindrical objects could include irrigation line I, electrical line, or rods, such as small rods 660, which can trap sheeting S of flexible material sandwiched between the small connector 540 and such a small rod 660.

When sheeting S is so attached to a structure such as a greenhouse G, the opportunity is presented to provide two layers of sheeting S, these layers being either non-foraminous or with holes therein, such as webbing or other porous flexible sheeting material. The structure, such as a greenhouse G, can have a first layer of sheeting adjacent to an outer surface of the greenhouse G defined by outer portions of the upright members U. Then, a series of multi-slot friction clamps 510 can be snapped on the upright members with the small connectors 540 facing inwardly toward an interior of the structure. A second layer of sheetings can be held directly adjacent to the upright tubular members U by utilizing the small rods 660 and small connectors 540 of the multiple different multi-slot friction clamps 510 to secure the second layer of sheetings adjacent to an inside surface of the upright tubular members U.

Two layers of non-foraminous sheeting material can entrap an insulating layer of air therebetween, so that the greenhouse G or other structure can more effectively resist heat transfer, such as for operation of a greenhouse G in particularly cold climates. The inner layer of sheeting S can be removed (such as when temperatures increase sufficiently) relatively simply, by removing the small rods 660 and pulling the sheeting S away from the small connectors 540.

In another embodiment, an outer layer of sheeting S can be in the form of webbing and the inner layer can be continuous and non-foraminous. In such an arrangement, a structure such as a greenhouse G could have some temperature protection when temperatures are cooler, and when the sheeting is removed, the webbing is in place to prevent birds and other pests from accessing the interior of the greenhouse G. In one embodiment, the small tubular rod 660 can itself be irrigation line I, so that the irrigation line is both acting to deliver water and also to hold sheeting S adjacent to a tubular member to which the multi-slot friction clamp 510 is attached.

With particular reference to FIGS. 27-38, details of a fastener structure are disclosed, which fastener structure includes two parts including a small clamps 610 and the small rod 660. The small clamp 610 is typically provided in relatively short lengths, such as two inches long, and the small rod 660 can either be provided in similar short lengths (such as two inches long) or can be provided in longer lengths and then cut to size or utilized as a long continuous rod (see FIG. 39).

The small rod 660 is sized to snap into the small clamp 610. This fastener structure including the small clamp 610 and small rod 660 can act as a fastener in at least two ways. First, flexible sheeting materials can be placed between the small clamp 610 and small rod 660 and when the small rod 660 is snapped into the small clamp 610, the sheeting materials are entrapped therebetween. As another option, structures can be fastened to plates 620, 670 on the small clamp 610 and/or small rod 660 to secure those structures together. Such attaching to the plate 660 or plate 670 can be through utilization of double stick tape, adhesive, staples, other mechanical fasteners such as clips, nails, screws or other connections.

The small clamp 610 preferably includes the plate 620 on the side of the small clamp 610 opposite a slot 650 between a first arcing finger 630 and a second arcing finger 640. The plate 120 includes ends 122 defining a length of the small clip 610 and edges 614 defining a width of the plate 620. A face 626 is on a portion of the plate 620 opposite the slot 650 and arcing fingers 630, 640. This face 626 identifies an ideal location for utilization of double stick tape or other fasteners to allow the small clamp 610 to be attached to other structures, such as upright tubular members U within a greenhouse G, so the small clamp 610 can support irrigation line I, electric wiring, or other elongate generally cylindrical structures.

The first arcing finger 630 includes a root 632 opposite a tip 634. The root 632 attaches the first arcing finger 630 to a junction 628 joining the arcing fingers 630, 640 to the plate 620. The second arcing finger 640 extends from a root 642 to a tip 644, with the root 642 adjacent to the junction 628 and the tip 128 opposite the root 642. The two tips 634, 644 of the two arcing fingers 630, 640 are similar to the snap lips 558 of the small connector 540, except that they are utilized in the small clamp 610. As a further alternative, the small clamp 610 could conceivably be utilized without the plate 620.

The slot 650 is provided between the two arcing fingers 630, 640. An inside of the slot 650 is similar to an inside of the slot 550 of the multi-slot friction clamp 510 and its small connector 540. For instance, grooves 652 are typically provided on surfaces inboard of the slot 650 to assist in gripping of the small clamp 610 to adjacent structures, such as sheeting material S or directly to the small rod 660.

Figure 33:
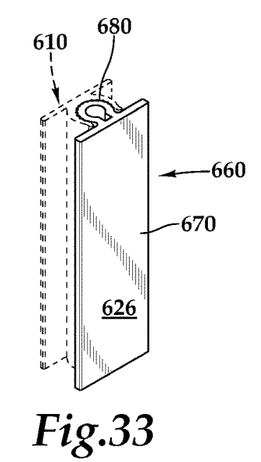
FIG. 33 is a perspective view of a rod structure sized to snap into a slot leading into a core of a small friction clamp, with the small friction clamp shown in broken lines.
Figure 34:
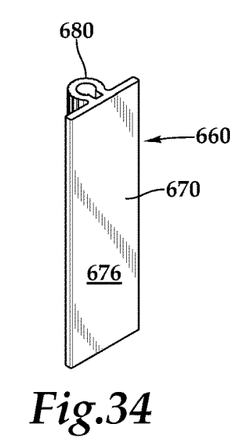
FIG. 34 is a perspective of view of the rod structure of FIG. 33.
Figure 35:
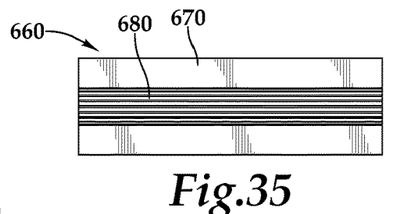
FIG. 35 is a front elevation view of that which is shown in FIGS. 33 and 34.
Figure 36:
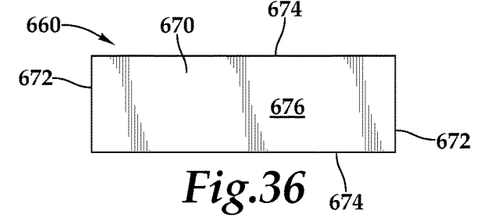
FIG. 36 is a rear elevation view of that which is shown in FIGS. 33 and 34.
Figure 37:
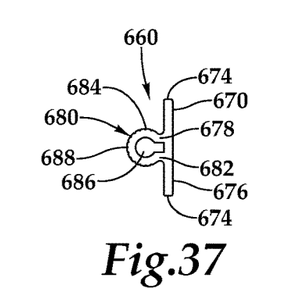
FIG. 37 is a left side elevation view of that which is shown in FIGS. 33 and 34, the right side elevation view being a mirror image.
Figure 38:
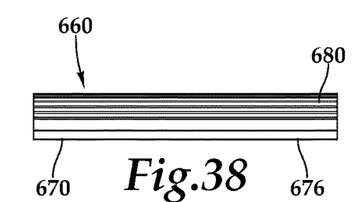
FIG. 38 is a top plan view of that which is shown in FIGS. 33 and 34.

The small rod 660 is preferably similar in length and width to the small clamp 610 and includes a plate 670 with opposing ends 672 and opposing edges 674. A face 676 of the plate 170 on the small rod 660 is preferably similar in size to the face 626 on the small clamp 610. A junction 678 joins to plate 672 of the small rod 660 and a barrel 680 thereof. This barrel 680 is preferably a generally cylindrical structure with a root 682 joining to the plate 670 at the junction 678.

The barrel 680 includes an outer cylindrical surface 684 which is sized to snap into the slot 650 of the small clamp 610 or into the slot 550 of the small connector 540 of the multi-slot friction clamp 510. The barrel 680 preferably includes a hollow core 686, which could conduct fluid if the small rod 660 is also functioning as irrigation tubing, or could be a hollow core merely to save weight and material, or to assist in utilizing a tool to pry the small rod 660 out of snap clamps 610. The barrel 680 preferably includes grooves 688 extending longitudinally thereon to assist in gripping between the small rod 660 and sheeting materials or directly with portions of the small clamp 610.

This small rod 660 can be provided in short lengths such as two inches long and similar in length to the small clamp 610, or the small rod 660 can be provided in exceptionally long lengths, such as eight feet long or other standard long lengths, or provided in a coil and being even longer. Such long length configurations for the small rod 660 can be cut to size and is useful as a continuous structure to snap into multiple separate small clamps 610, such as depicted in FIG. 39, and especially for holding sheeting material S to tubular upright members U utilizing the multi-slot friction clamp 510 along with such an elongate small rod 660.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:
1. A greenhouse, comprising combination:
a tubular structure;
a flexible sheeting layer outside of said tubular structure;
a plurality of friction clamps attached to said tubular structure, said friction clamps including a large cylindrical body having an elongate form between a first end and a second end opposite said first end, a cylindrical elongate hollow core within said large cylindrical body, said elongate cylindrical hollow core open at said ends, a slot passing laterally through said large cylindrical body and into said core, said slot having a width sized to be less than a diameter of said core, said large cylindrical body formed of a resilient material, a small cylindrical body attached to an exterior surface of said large cylindrical body, said small cylindrical body being smaller than said large cylindrical body, said small cylindrical body having an elongate cylindrical hollow core within said small cylindrical body, said small cylindrical body having a slot passing laterally through said small cylindrical body and into said core of said small cylindrical body, said slot of said small cylindrical body having a width less than a diameter of said core of said small cylindrical body, and said small cylindrical body formed of a flexible resilient material;
said small cylindrical body facing at least somewhat inwardly toward an interior of the greenhouse;
an inner flexible sheeting layer inboard of said tubular structure and said friction clamps; and
a rod snapped into each of said small cylindrical bodies of said friction clamps with said inner sheeting between said rods and said small cylindrical bodies.

2. The greenhouse of claim 1 wherein one of said outer sheeting and said inner sheeting includes open webbing, and another of said outer sheeting and said inner sheeting is non-foraminous.

3. The greenhouse of claim 2 wherein said rods are hollow water conveying tubes.

4. A snapping fastener, comprising in combination:
   a first clamp portion;
   a second rod portion;
   said first clamp portion including a cylindrical body having a hollow core within said cylindrical body;
   said first clamp portion having a slot passing laterally through said cylindrical body and into said core of said cylindrical body;
   said slot in said cylindrical body having a width less than a diameter of said core;
   said first clamp portion formed of a resilient material;
   said rod portion sized to fit through said slot and into said core with resilient flexing of said cylindrical body;
   at least one of said first clamp portion and said second rod portion including a planar plate on a portion thereof;
   wherein double-sided tape is affixed to said planar plate on a side of said planar plate; and
   wherein both said first clamp portion and said second rod portion include a separate said planar plate thereon.

5. The fastener of claim 4 wherein said rod portion includes a hollow core and fittings on ends thereof for transport of water therethrough.

\* \* \* \* \*